Patented Aug. 29, 1933

1,924,763

UNITED STATES PATENT OFFICE 1,924,763

PREPARATION OF CARBOXYLIC ACIDS

Gilbert B. Carpenter, Elizabeth, N. J., assignor to E. I. du Pont de Nemours & Company, Wilmington, Del., a corporation of Delaware No Drawing. Application June 28, 1932
Serial No. 619,737

18 Claims. (Cl. 260—116)

This invention relates to the synthesis of organic compounds and particularly to the preparation of higher aliphatic acids by the interaction of olefines, carbon monoxide, and steam.

In my copending application Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide, and an olefine in the presence of a catalyst. Another object of the invention is to provide a process for the preparation of acids having the structural formula—

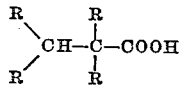

from steam, carbon monoxide, and an olefinic hydrocarbon, the R indicating hydrogen or a substituted or unsubstituted similar or dissimilar alkyl or aralkyl grouping. Other objects and advantages will hereinafter appear.

I have found that aliphatic carboxylic acids can be prepared from steam, carbon monoxide, and an olefinic hydrocarbon in the presence of hydrogen halides or compounds which decompose to form hydrogen halides under the conditions existing during the reaction. In order to effect the reaction the reactants together with a compound or hydrogen halide are passed into the reaction chamber under suitable pressure and temperature conditions. Generally, it is preferable for maximum yields to have in the reaction chamber a catalyst for the reaction such as, for example, an acid catalyst, phosphoric acid, boric acid, etc., or a metal halide such as manganese chloride, calcium chloride, etc. or any other suitable catalyst for the reaction.

The catalysts may be supported on various types of supports such, for example, as silica gel, alumina, pumice, etc., although a form of activated carbon, such as activated charcoal, is preferred.

For this reaction activated carbon plays more than a role of a support for it has been found that even in the absence of a catalyst supported thereon, it catalyzes the reaction. Furthermore, as indicated above the hydrogen halides, per se, are likewise catalysts for the reaction, altho they are more efficient when used in conjunction with other catalysts. The most active combination of the hydrogen halides with other catalysts is realized when this gaseous constituent is used with a form of activated carbon which may or may not support a third catalyst. In the former case there results a three-component catalyst which may be illustrated by a catalyst comprising a hydrogen halide, used in association with a zinc halide, supported on activated carbon, the volatile halide preferably passing with the reactants into the reaction chamber containing the supported catalyst. It is to be understood that supports other than activated carbon supports may be used but ordinarily the activity of the resulting catalyst is not as great as the same type of catalyst supported on a form of activated carbon.

The catalysts which may be used associated with the halogen halide include the acid catalysts such as phosphoric acid, arsenic acid, boric acid, silico tungstic acid, etc.; the metallic halides which include more particularly the alkali and alkaline earth metal halides, viz. the bromides, chlorides, and iodides of lithium, sodium, potassium, rubidium, calcium, caesium, strontium, magnesium, and barium, as well as the halides of the following metals: tin, iron, cobalt, nickel, bismuth, manganese, lead, tellurium, zinc, cadmium and others; the various forms of activated carbon and more particularly activated charcoal; and the acid salts of arsenic, boron, chromium, vanadium, silicon, molybdenum, tungsten, e. g. phospho-tungstic acid, chromium vanadate, etc. These catalysts are, with but one exception, viz. activated carbon, all of an acidic nature. That is, either they are acids or under the conditions of the reaction hydrolyze or otherwise decompose to give an acidic constituent. Such catalysts will be designated in the claims as "solid acidic catalysts" in contradistinction to the volatile halides which I will now more fully particularize.

The volatile halides which I prefer to employ, i. e. those which are generally introduced into the vaporized reactants, include the hydrogen halides, e. g. hydrogen chloride, hydrogen iodide, and hydrogen bromide. It is not essential, as indicated above, that the volatile halides be added as a hydrogen halide to the reaction, for compounds, which decompose to give such halides or which form the halides under the conditions of the reaction, are likewise suitable. Examples of such compounds are the volatile organic halides, as methyl and ethyl chloride, iodide, bromide, etc., as well as the ammonium halides, e. g. ammonium chloride, ammonium iodide, the chloramines, etc.

Raw materials suitable for use in the process are readily available from a number of sources, thus, ethylene and various homologues thereof are found in the gases evolved in cracking petroleum and may be separated therefrom, for example, by fractional liquefaction. It is preferable, for the sake of avoiding undesirable by-products, that the hydrocarbon to be converted be employed in a relatively high degree of purity.

The carbon monoxide required for the synthesis may be conveniently derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200–400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practicing the invention, altho the invention is not limited to the examples:

*Example 1.*—A gaseous mixture containing by volume 90 parts carbon monoxide, 5 parts ethylene, and 20 parts steam, is passed together with approximately 5 parts of hydrogen chloride into a conversion chamber containing a zinc chloride catalyst disposed upon activated charcoal. The catalyst is prepared by saturating the activated charcoal with a solution of zinc chloride of sufficient concentration to give a charcoal containing approximately 20% by weight of zinc chloride. The catalyst chamber is designed for carrying out exothermic gaseous reactions and the temperature maintained therein at approximately 325° C. while the pressure is held at approximately 700 atmospheres. The condensate obtained upon cooling the converted gases will give a good yield of aliphatic carboxylic acid containing a high percentage of propionic acid.

*Example 2.*—A gaseous mixture having a composition similar to that employed in Example 1 is passed with a like quantity of hydrogen bromide into a conversion chamber containing sodium bromide. By maintaining a temperature of approximately 300° C. and a pressure in the neighborhood of 600 atmospheres a good yield of propionic acid will be realized.

*Example 3.*—Propionic acid together with other aliphatic carboxylic acids can be obtained by employing hydrogen chloride and calcium chloride as the associated catalysts for the reaction using the temperature and pressure conditions as well as the same gaseous mixture that is used in Example 1.

*Example 4.*—A gaseous mixture comprising 5.4 mol per cent. ethylene, 94.6 mol per cent. carbon monoxide, 0.5 mol per cent. hydrochloric acid, together with a ratio in mol per cent. of steam to the above gases of 0.25 is passed at a temperature of 325° C., a pressure of 700 atmospheres, and a space velocity of 1200, over a catalyst comprising 18% phosphoric acid supported on activated charcoal. A high yield of propionic acid with some formic acid, ethyl propionate, and ethanol will be obtained.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with copper, molybdenum, cobalt, tungsten, manganese, or nickel.

Various changes may be made in the method hereinbefore described without departing from the invention or sacrificing the advantages thereof.

I claim:

1. In a process of reacting an olefinic hydrocarbon, steam, and carbon monoxide, and thereby producing an aliphatic carboxylic acid, the employment of a volatile halide as a catalyst for the reaction.

2. In a process of reacting an olefine, steam, and carbon monoxide, and thereby producing an aliphatic carboxylic acid, the employment of a volatile halide as a catalyst for the reaction.

3. In a process of reacting an olefinic hydrocarbon, steam, and carbon monoxide, and thereby producing an aliphatic carboxylic acid, the employment of a hydrogen halide as a catalyst for the reaction.

4. In a process of reacting an olefine, steam, and carbon monoxide, and thereby producing an aliphatic carboxylic acid, the employment of a hydrogen halide as a catalyst for the reaction.

5. In a process of reacting an olefine, steam, and carbon monoxide, and thereby producing an aliphatic carboxylic acid, the employment of a catalyst consisting essentially of a hydrogen halide associated with a "solid acidic catalyst."

6. In a process of reacting an olefinic hydrocarbon, steam, and carbon monoxide and thereby producing an aliphatic carboxylic acid, the employment of a hydrogen halide and phosphoric acid as a catalyst for the reaction.

7. In a process of reacting an olefine, steam, and carbon monoxide, and thereby producing an aliphatic carboxylic acid, the employment of a catalyst consisting essentially of a hydrogen halide associated with an acid catalyst.

8. In a process of reacting an olefinic hydrocarbon, steam, and carbon monoxide and thereby producing an aliphatic carboxylic acid, the employment of a hydrogen halide and an acid catalyst.

9. In a process of reacting an olefinic hydrocarbon, steam, and carbon monoxide and thereby producing an aliphatic carboxylic acid, the employment of a catalyst consisting essentially of a hydrogen halide associated with a "solid acidic catalyst" and a form of activated carbon.

10. In a process of reacting ethylene, steam, and carbon monoxide and thereby producing propionic acid, the step which comprises conducting the reaction in the presence of a catalyst consisting essentially of hydrogen halide.

11. In a process of reacting ethylene, steam, and carbon monoxide and thereby producing propionic acid, the step which comprises conducting the reaction in the presence of a catalyst consisting essentially of hydrogen chloride.

12. In a process of reacting ethylene, steam, and carbon monoxide and thereby producing propionic acid, the step which comprises conducting the reaction in the presence of a catalyst consisting essentially of hydrogen halide associated with a "solid acidic catalyst."

13. In a process of reacting ethylene, steam, and carbon monoxide and thereby producing propionic acid, the step which comprises conducting the reaction in the presence of a catalyst consisting essentially of hydrogen halide and a form of activated carbon.

14. In a process of reacting ethylene, steam, and carbon monoxide and thereby producing propionic acid, the step which comprises conducting the reaction in the presence of a catalyst consisting essentially of hydrogen chloride and a form of activated carbon.

15. In a process of reacting ethylene, steam, and carbon monoxide and thereby producing propionic acid, the step which comprises conducting the reaction in the presence of a catalyst consisting essentially of hydrogen halide, a form of activated carbon, and a "solid acidic catalyst."

16. In a process of reacting ethylene, steam, and carbon monoxide and thereby producing propionic acid, the step which comprises conducting the reaction in the presence of a catalyst consisting essentially of hydrogen chloride, a form of activated carbon, and a "solid acidic catalyst."

17. In a process of reacting ethylene, steam, and carbon monoxide and thereby producing propionic acid, the step which comprises conducting the reaction in the presence of a volatile halide.

18. In a process of reacting ethylene, steam, and carbon monoxide and thereby producing propionic acid, the step which comprises conducting the reaction in the presence of hydrogen chloride and activated charcoal.

GILBERT B. CARPENTER.